United States Patent [19]

Kalawsky

[11] Patent Number: 5,394,517
[45] Date of Patent: Feb. 28, 1995

[54] INTEGRATED REAL AND VIRTUAL ENVIRONMENT DISPLAY SYSTEM

[75] Inventor: Roy S. Kalawsky, Brough, England

[73] Assignee: British Aerospace plc, Hampshire, England

[21] Appl. No.: 959,919

[22] Filed: Oct. 14, 1992

[30] Foreign Application Priority Data

Oct. 12, 1991 [GB] United Kingdom ............... 9121707

[51] Int. Cl.$^6$ .............................................. G06F 15/20
[52] U.S. Cl. ..................................... 395/129; 395/135
[58] Field of Search ............... 395/129, 123, 125, 126, 395/131, 135, 155–161

[56] References Cited

U.S. PATENT DOCUMENTS

| | | | |
|---|---|---|---|
| 4,205,224 | 5/1980 | Mecklenborg | 250/201 |
| 4,952,024 | 8/1990 | Gale | 350/143 |
| 4,954,970 | 9/1990 | Walker et al. | 395/135 |
| 4,970,666 | 11/1990 | Welsh | 395/123 |
| 4,975,770 | 12/1990 | Troxell | 358/96 |
| 5,012,342 | 4/1991 | Olsen et al. | 358/181 |
| 5,113,177 | 5/1992 | Cohen | 340/705 |

FOREIGN PATENT DOCUMENTS

2201069  8/1988  United Kingdom .

*Primary Examiner*—Mark R. Powell
*Assistant Examiner*—Huynh Ba
*Attorney, Agent, or Firm*—Nixon & Vanderhye

[57] ABSTRACT

This invention relates to improvements in so-called "virtual reality" computer systems. The display system described enables the effective integration of computer generated images and real, naturally occurring images in the visual display units which provide the user with his entire visual stimulation. Areas of the user's notional field of view where computer-generated imagery is required (for example the cockpit canopy in an aircraft flight simulator) are coloured with a predetermined colour or intensity. Two video cameras are provided, each of which is mounted so that its field of view corresponds to a respective one of the notional fields of view of the user's eyes. The signals from the video cameras are analysed to determine the presence of the predetermined colour or intensity, thereby giving an indication that a computer generated image is required for that part of the video camera's field of view. If the predetermined colour or intensity is not present, the signal from the video camera is relayed directly to the appropriate one of the visual display units.

11 Claims, 2 Drawing Sheets

INTEGRATED REAL AND VIRTUAL ENVIRONMENT DISPLAY SYSTEM

BRIEF DESCRIPTION OF THE INVENTION

This invention relates to improvements in the perception of computer generated imagery, and more particularly to the effective integration of computer generated images with real, naturally occurring images in helmet mounted visual display units which provide the user with his entire visual stimulation.

BACKGROUND OF THE INVENTION

Recent developments in computer technology have enabled so-called "virtual reality" computer systems to be produced. These systems provide complete visual stimulation for the user usually by means of a helmet mounted display apparatus comprising a pair of miniature Visual Display Units (VDUs) arranged to project their images into respective ones of the user's eyes such that the image displayed is perceived stereoscopically thereby creating the illusion that the image is three-dimensional. These systems allow the user to interact with the displayed image by providing a means of monitoring movement of the user's head and, in some examples, movement of his eyes and other parts of his body. The information obtained by monitoring these movements allows the system to generate and present different images to the respective eyes of the user corresponding to changes in his line of sight. An example of such a system is given in British patent no. 2201069.

Current virtual reality systems present the user with a graphics display which is entirely computer generated. The computer graphics system generates the complete visual image for each of the VDUs in the helmet mounted display. In many applications highly complex images need to be generated which, combined with the necessity to have them produced in real time, makes very heavy demands on computing power in terms of memory size and speed of access. One particularly notable problem is that of realistically representing the user's hands, legs and feet whenever the user's current line of sight would include those parts of his body. The result is that the systems are extremely expensive or they provide simpler images than are desirable for optimum realism.

Attempts have been made to overcome the need for high computing power by laying the computer generated image over the real image of a scene by using an optical combiner to combine the two images. Although these systems are less demanding in terms of what is required of the computer generated images because the images may then occupy a smaller area, the system now must determine which part of the scene viewed by the user the computer generated image should occupy as his line of sight changes as a result of eye and head movements. Current head position sensors are limited in terms of positional accuracy, and, when used with such visually coupled systems, any errors in the calculation of head position cause the computer generated image to move relatively and unrealistically within the real scene. Under certain circumstances this image motion can be extremely objectionable and may even cause nausea.

SUMMARY OF THE INVENTION

An object of the present invention is to provide an improved system whereby a real scene can be overlaid with computer generated images.

According to the present invention there is provided a display system for presenting a composite image consisting of a real portion and a complementary computer-generated synthetic portion to a user's eyes, the system comprising:

visual display means for presenting the composite image;

direction sensor means for producing a direction signal indicative of the direction of the user's field of view;

video camera means for producing a sequence of video signals which in combination are representative of a field of view thereof, Camera mounting means for mounting said video camera means such that the field of view of the video camera means is substantially coincident with and follows movement of the field of view of the user;

image generating means responsive to said direction signal for producing a correspondingly appropriate computer-generated portion of the composite image; and, image selecting and combining means having input connected to said video camera means, to said image generating means and to said direction sensor means and outputs connected to said visual display means for analysing each of said video signals to determine by comparison with stored reference data whether each video signal is indicative of an area of the field of view of the video camera means which the computer-generated image is to occupy and for correspondingly selecting an appropriate one of said video signals or said synthetic signals, combining the resultant sequence of video and synthetic signals to form composite image signals representing the composite image and applying said composite image signals to said visual display means for presentation of the composite image thereon.

Preferably said camera mounting means comprises means for mounting said video camera means on the user's head for movement therewith.

Alternatively said camera mounting means comprises moveable mounting means for mounting said video camera for movement in response to said direction signal.

Preferably, said visual display means comprises two visual displays which present different composite images to respective ones of the user's eyes; said video camera means comprises two video cameras each of which have a field of view which is substantially coincident with the fields of view of respective ones of the user's eyes; said image generating means produces two sets of synthetic signals representing two computer-generated portions, and, said image selecting and combining means analyses the video signals from respective ones of said two video cameras and produces two different composite images which, when presented to respective ones of the user's eyes, are perceived stereoscopically.

Optionally, the stored reference data relates to a predetermined colour and said image selecting and combining means comprises means for analysing each of said video signals by determining the colour thereof and comparing the colour with the predetermined colour select said synthetic signals whenever the colours match.

Alternatively the stored reference data relates to a predetermined intensity and said image selecting and combining means analyses each of said video signals by determining the intensity thereof and comparing the intensity with the predetermined intensity to select said synthetic signals whenever the intensities match or one exceeds the other according to a predetermined rule.

Advantageously said visual display unit means provides substantially complete visual stimulation for the user.

BRIEF DESCRIPTION OF THE DRAWINGS

For a better understanding of the invention, an embodiment of it will now be described by way of example only, and with particular reference to the accompanying drawings, in which.

DESCRIPTION OF THE PREFERRED EMBODIMENTS

To improve understanding of the drawings, like elements which appear in more than one figure are designated by the same reference number.

Figure 1:
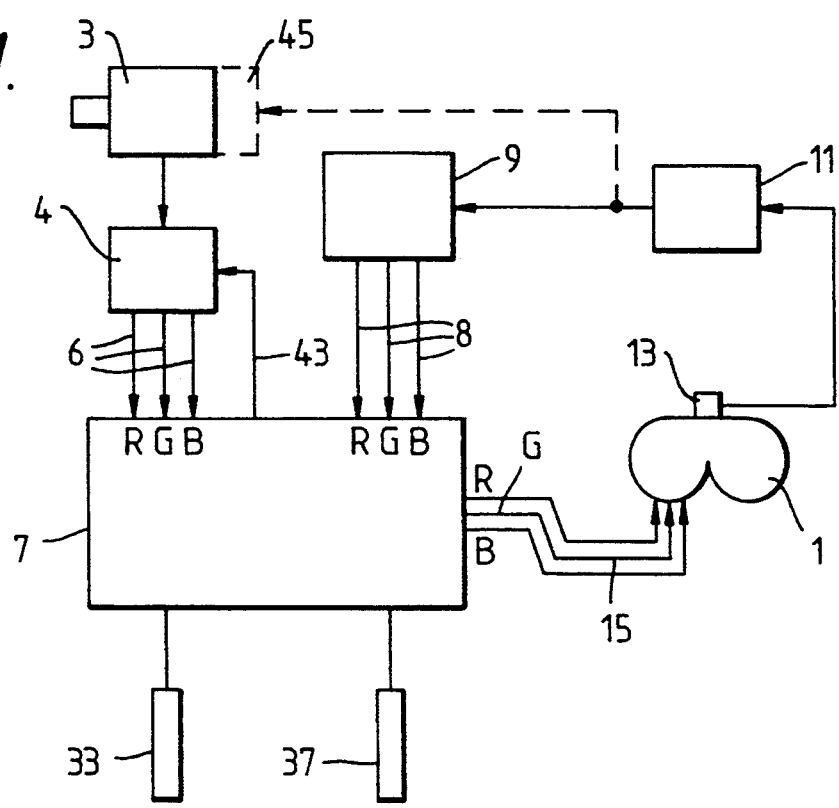
FIG. 1 shows a schematic diagram of a display system according to the present invention.

FIG. 1 shows schematically a display system for combining computer generated and real images on two miniature VDUs (not shown) in a user's helmet mounted display 1. The system includes a miniature video camera 3 which is connected to camera control unit 4 for passing images of a viewed scene, such as an aircraft cockpit interior shown in FIG. 2, thereto. The camera 3 is mounted on the helmet mounted display 1 so that its field of view is altered when the user moves his head. The camera control unit 4 contains all the electronics which does not have to be included in the body of the camera 3 (to save weight) and converts the composite video signal received from camera 3 into three primary (red, green and blue) colour signals 6. These signals are applied to a computer generated and real image combining circuit 7, sometimes referred to as a "chroma key" system. Also applied to the combining circuit 7 are three primary colour signals 8 received from image generating computer 9 which receives at a control input signals representing the position of the user's head (not shown) calculated by head position determining circuit 11. A sensor 13 mounted on helmet mounted display 1, and which therefore moves with the user's head, provides signals representing head movement to the position determining circuit 11. An example of a suitable sensor is sold by Polhemus Navigation Sciences, a division of McDonnel Douglas Electronics Company, under the name 3space (Trade Mark) Isotrack. The signals 6 and 8 are combined in the combining circuit 7 to provide a combined output 15 which comprises the real scene viewed by camera 3 overlaid with the computer generated image.

If the system is to provide different images to each of the VDUs in the helmet mounted display 1 such that the image is perceived stereoscopically by the user, an additional video camera, camera control unit, image combining circuit and possibly image generating computer are required. These additional elements are configured as those described above. For the sake of brevity the operation to produce just one combined image will be described. This single image could be displayed on both the VDUs in the helmet mounted display 1 but obviously it is desirable to provide the user with a stereoscopic image.

Figure 2:
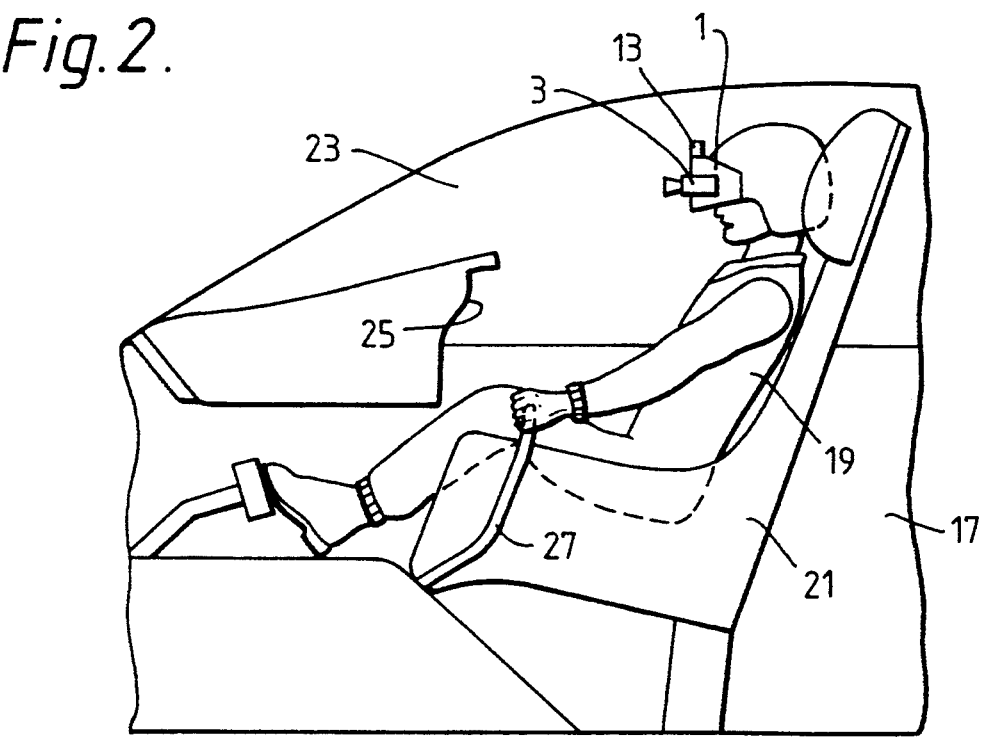
FIG. 2 shows an aircraft cockpit interior with which the display system of FIG. 1 is used.

FIG. 2 shows part of an aircraft cockpit interior 17 which is used as part of a flight simulation system. The user 19 of the system sits in the normal flying position in seat 21. With the helmet mounted display removed, the user's 19 field of view would include the view through the cockpit canopy 23, the instrument panel 25 and the joystick 27. However, when the display system is in use the user 19 wears the helmet mounted display 1 and the two miniature VDUs contained therein provide him with all his visual stimulation.

Clearly, in order to provide flight simulation, realistic computer generated images must be displayed in the area occupied by the cockpit canopy 23; whereas the remainder of what would be in the pilot's field of view could be viewed naturally without affecting realism. In order that the display system can identify areas where a computer generated image is required, such areas are coloured in a single colour which does not appear elsewhere in the field of view. In this example the cockpit canopy 23 is coloured blue and uniformly illuminated, although any colour which meets the above criterion could also be used.

Camera 3 is mounted on the helmet mounted display 1, and is therefore moved with the user's 19 head such that the camera 3 has a field of view which is equivalent to that of one of the user's 19 eyes. (Obviously for stereoscopic vision two cameras would be provided, one mounted on either side of the helmet mounted display 1 and each having a field of view equivalent to that of respective ones of the user's eyes.) The signals from the camera 3 are converted into the three colour signals 6 by camera control unit 4. The signals 6 are then passed to combining circuit 7. Also passed to the combining circuit 7 are the three colour signals 8 which make up the computer generated image produced by image generating computer 9. This image generating computer 9 is of a known design and is programmed to produce an image which occupies the area of the cockpit canopy using signals received from the head position determining circuit 11. These signals allow the computer 9 to calculate the required composition, size and shape of the computer generated image.

Figure 3:
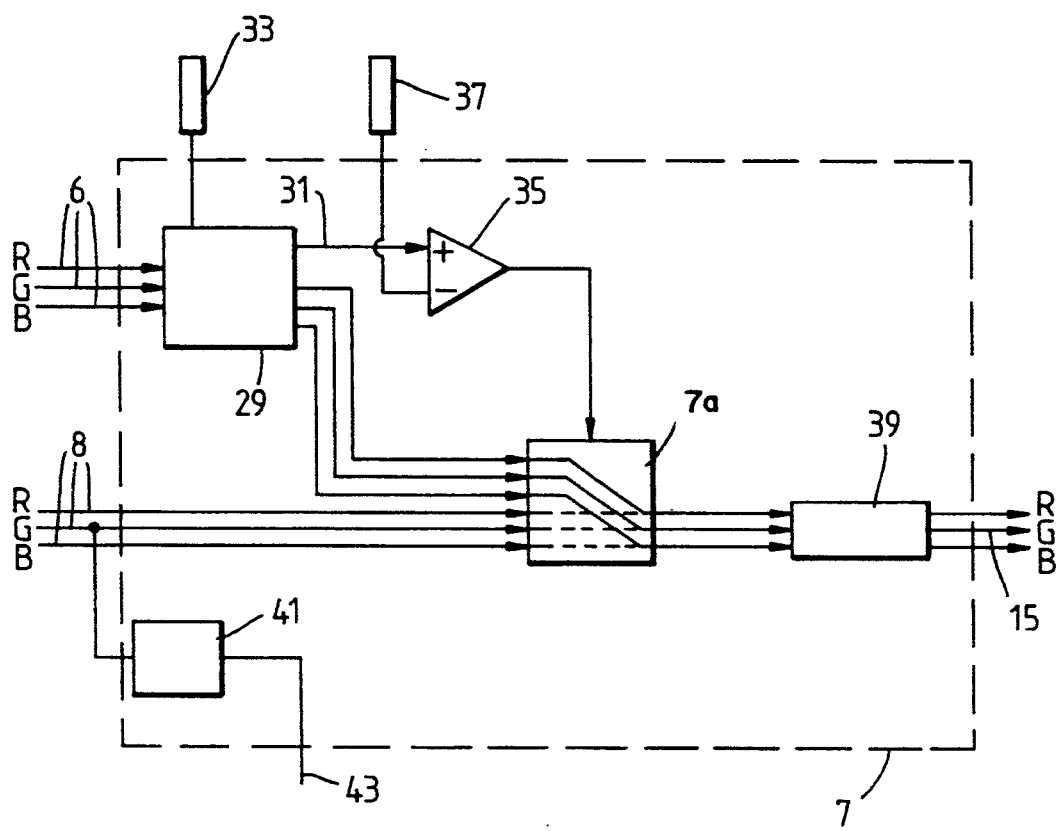
FIG. 3 shows a more detailed schematic diagram of the computer generated and real image combining circuit shown in FIG. 1.

FIG. 3 shows the contents of the computer generated and real image combining circuit 7 enclosed by dotted lines. The operation is as follows. The signal 6 derived from the field of view of camera 3 is passed to detector circuit 29. The operation of circuit 29 is such that it generates an output signal 31 whenever a specified colour occurs in signals 6. This colour is selected by a control 33 which sets the appropriate percentages of red, green and blue so that it is the same colour as that of cockpit canopy 23. The output signal 31, the strength of which is proportional to the closeness of the colour to the colour set by control 33, is passed to the positive input of comparator 35. The negative input of comparator 35 is connected to threshold control 37 which, by setting the voltage at the negative input, establishes what strength of signal 31 is to cause the comparator 35 to switch from zero voltage output (indicating that the specified colour is not present) to its saturation output (indicating that the specified colour is present). The comparator 35 output controls the operation of switch 37 which selects either the image from the video camera 3 (represented by signals 6), or from the image generating computer 9 (represented by signals 8), at a given instant on the raster scan of the video camera 3 for output to conventional video amplifier 39 which produces a drive standard 75 ohm output video signal which is fed to helmet mounted display 1. The signal 8 from the image generating computer 9 is also processed by circuit 41 to produce a pulse output 43 which is fed to camera control unit 4 in order to synchronise its raster scan with the video signals produced by the image generating computer 9.

The effect, therefore, of the combining circuit 7 is to continuously monitor the output signal 6 derived from the video camera 3 for the presence of the colour chosen for the cockpit canopy 23, the presence of this colour being indicative that a computer generated image is required for that position, and, in response to that monitoring, selecting for output at that point on the raster scan to the user's 19 helmet mounted display 1 either the signal from the video camera 3 or from the image generating computer 9.

One of the advantages of this embodiment over the known optical combiner referred to above, is that the video camera provides the user with the real (i.e. not computer generated) part of the image. This enables the colour of the video signal to be analysed so that the computer generated image never occupies an area which should form a "real" part of the image irrespective of any errors in the sensor 13. The computer generated and real image combining circuit could be adapted to work with composite video inputs (PAL), but this would require additional circuitry to extract the primary colour information and to compensate for phase delays in this circuitry.

As an alternative to mounting the video camera 3 on the user's helmet mounted display 1, the camera could instead be mounted on a fixed part of cockpit interior 17 by way of an electrically controlled servo-motor driven mounting 45 (shown ghosted in FIG. 1). The signal (shown by the dotted line in FIG. 1) from the position determining circuit 11 is then also applied to the mounting 45 to cause the camera 3 to move such that it has a field of view which is equivalent to the user's eyes. The movement could be provided by way of gimbals, for example. One of the advantages of mounting the camera 3 on the cockpit interior is that the movement of the video camera 3 and the input of image generating computer 9 are both driven by signals derived from the same helmet mounted sensor 13 and thus any errors in the measurement of the position of the user's head affect both the video camera 3 and the image generated computer 9 in the same way. Hence, the problem of the computer generated image moving relatively within the real scene, which is associated with conventional computer generated and real image combining systems, may be overcome.

In addition to detecting head movement, the sensor 13 may include a further sensor contained in the helmet mounted display 1 which detects movement of the user's eyes. This additional information would be fed to the image generating computer 9 via position determining circuit 11 in a similar manner to the head position determining information. In the case where the camera 3 is mounted on the helmet mounted display 1, it will need to be movable in response to an eye position signal from the position determining circuit 11. In the case where the camera 3 is mounted on a fixed part of the cockpit interior, the eye position signal will simply comprise an additional element to the signal from the position determining circuit 11 which is fed to the mounting 45.

It will be understood that the aircraft cockpit of the flight simulator can be changed to allow the user to gain experience of a range of aircraft without the need to alter the display system because the areas where a computer image is required are simply designated by their blue colouring.

Further, the instrument panel displays could be coloured so that a computer generated image appears thereon in order that they give a display indicative of aircraft flight.

In cases where the ergonomic design of a proposed cockpit interior requires testing before manufacture, the cockpit interior may itself be generated by the image generating computer, leaving the pilot's body as the only "real" part of the image. In this way the legibility of displays from different angles of view could be determined.

If a "data glove" such as that described in U.S. Pat. No. 4,988,981 (Zimmerman et al) is worn on the user's hand the accessibility of various controls could also be tested. A data glove includes sensors for detecting the gestures of the hand as well as a hand position sensor positioned on the glove. The signals from these sensors are fed to the image generating computer 9 so that the position of the user's hand and any gestures made can be used to effect the computer generated image—for example by showing the operation of a switch on a control panel. Unlike the system described in the aforesaid U.S. Pat. No. 4,988,981, the embodiment described obviates the need to produce a computer generated representation of the user's hand.

As an alternative to detecting a particular colour to determine the correct position of computer generated imagery, the intensity of light could instead be measured and used to determine positioning. In this way, the cockpit canopy 23 could be made of a highly radiation absorbent material or highly illuminated to designate that computer generated imagery is required in this area.

The system described could obviously be used in many other applications. For example, the system could be used inside a motor vehicle with the image generating computer 9 producing the views from the vehicle's windows. In this case the windows would be coloured and uniformly illuminated in a selected colour, thereby allowing the computer generated and real image combining circuit 7 to distinguish between areas where computer generated images and real images are required.

What is claimed is:

1. A display system for presenting a composite image to a user's eyes, said image comprised of a real portion provided by a video camera means and a complementary computer-generated synthetic portion said system including stored reference data indicative of the real portion and the synthetic portion, said user having a field of view in a direction, the system comprising:

visual display means for presenting the composite image;

direction sensor means for producing a direction signal indicative of the direction of the user's field of view;

video camera means for producing a sequence of video signals which in combination are representative of a field of view thereof;

camera mounting means for mounting said video camera means such that the field of view of the video camera means is substantially coincident with and follows movement of the field of view of the user;

image generating means responsive to said direction signal for producing synthetic signals representing a computer-generated portion of the composite image; and, image selecting and combining means, responsive to said video camera means, to said image generating means and to said direction sensor means and providing an output to said visual display means, for analyzing each of said video signals and determining, by comparison with said stored reference data, whether each video signal is indicative of an area of the field of view of the video camera means which said computer-generated portion is to occupy and for correspondingly selecting one of said video signals and said synthetic signals, and for combining said video and synthetic signals to form a composite video signal representing the composite image and for applying said composite video to said visual display means for presentation of the composite image.

2. A display system according to claim 1, wherein said camera mounting means comprises means for mounting said video camera means on the user's head for movement therewith.

3. A display system according to claim 1, wherein said camera mounting means comprises moveable mounting means for mounting said video camera for movement in response to said direction signal.

4. A display system according to claim 1 wherein the stored reference data relates to a predetermined colour and said image selecting and combining means comprises means for analyzing each of said video signals by determining the colour thereof and comparing the colour with the predetermined colour and for selecting said synthetic signals whenever the colours match.

5. A display system according to claim 2 wherein the stored reference data relates to a predetermined colour and said image selecting and combining means comprises means for analyzing each of said video signals by determining the colour thereof and comparing the colour with the predetermined colour and for selecting said synthetic signals whenever the colours match.

6. A display system according to claim 3 wherein the stored reference data relates to a predetermined colour and said image selecting and combining means comprises means for analyzing each of said video signals by determining the colour thereof and comparing the colour with the predetermined colour and for selecting said synthetic signals whenever the colours match.

7. A display system according to claim 1, wherein said user has two eyes, each eye having a separate field of view, said visual display means comprises two visual displays which present different composite images to respective ones of the user's eyes; said video camera means comprises two video cameras each of which have a field of view which is substantially coincident with the fields of view of respective ones of the user's eyes; said image generating means produces two sets of synthetic signals representing the computer-generated portions; and, said image selecting and combining means includes means for analyzing the video signals from respective ones of said two video cameras and produces two different composite images which, when presented to respective ones of the user's eyes, are perceived stereoscopically by said user.

8. A display system according to claim 1 wherein the stored reference data relates to a predetermined intensity and said image selecting and combining means includes means for analyzing each of said video signals by determining the intensity thereof and comparing the intensity with a predetermined intensity and selecting said synthetic signal whenever one of the following conditions apply (1) the intensities match and (2) one intensity exceeds the other intensity according to a predetermined rule.

9. A display system according to claim 2 wherein the stored reference data relates to a predetermined intensity and said image selecting and combining means includes means for analyzing each of said video signals by determining the intensity thereof and comparing the intensity with a predetermined intensity and selecting said synthetic signals whenever one of the following conditions apply (1) the intensities match and (2) one intensity exceeds the other intensity according to a predetermined rule.

10. A display system according to claim 3 wherein the stored reference data relates to a predetermined intensity and said image selecting and combining means includes means for analyzing each of said video signals by determining the intensity thereof and comparing the intensity with a predetermined intensity and selecting said synthetic signals whenever one of the following conditions apply (1) the intensities match and (2) one intensity exceeds the other intensity according to a predetermined rule.

11. A display system according to claim 1, wherein said visual display unit means provides the only visual stimulation for the user.

* * * * *